United States Patent [19]

Raymond

[11] 4,309,837
[45] Jan. 12, 1982

[54] APPARATUS FOR SHAKING FISH FREE FROM GILLNETS, LONGLINES AND SIMILAR FISH CAPTURING MEANS

[75] Inventor: Charles Raymond, Marshall, Calif.

[73] Assignee: Anchor Machine & Manufacturing, Inc., Mt. Vernon, Wash.

[21] Appl. No.: 139,775

[22] Filed: Apr. 11, 1980

[51] Int. Cl.³ .............................................. A01K 73/00
[52] U.S. Cl. .............................................. 43/8; 74/49
[58] Field of Search ...................... 43/8; 414/527, 140; 114/253, 254; 366/128, 108, 123; 74/49, 50; 51/163.1, 7

[56] References Cited

U.S. PATENT DOCUMENTS

| 981,918 | 1/1911 | Davidson | 43/8 |
|---|---|---|---|
| 3,047,973 | 8/1962 | Paretic | 43/8 |
| 3,603,016 | 9/1971 | Ursich | 43/8 |
| 3,707,799 | 1/1973 | Hatley | 43/8 |
| 4,204,354 | 5/1980 | Kane | 43/8 |

*Primary Examiner*—James L. Jones, Jr.
*Attorney, Agent, or Firm*—Hughes, Barnard & Cassidy

[57] ABSTRACT

Apparatus for shaking fish free from gillnets, longlines and similar fish capturing means as such fish capturing means are hauled aboard a fishing vessel so as to disentangle fish individually snared on such fish capturing means and to permit such freed fish to fall into the hold of the fishing vessel or into other suitable fish collecting and/or processing means.

20 Claims, 15 Drawing Figures

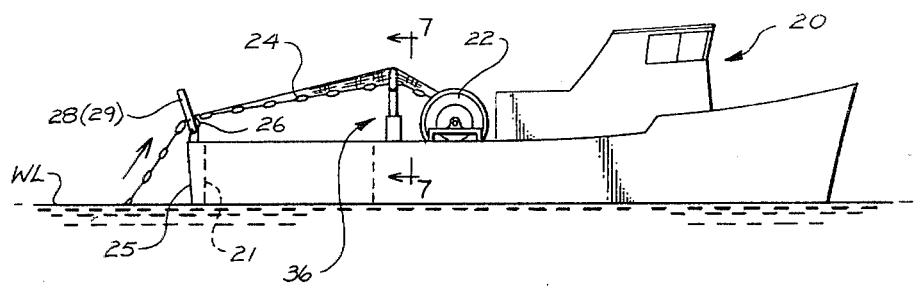
FIG. 1
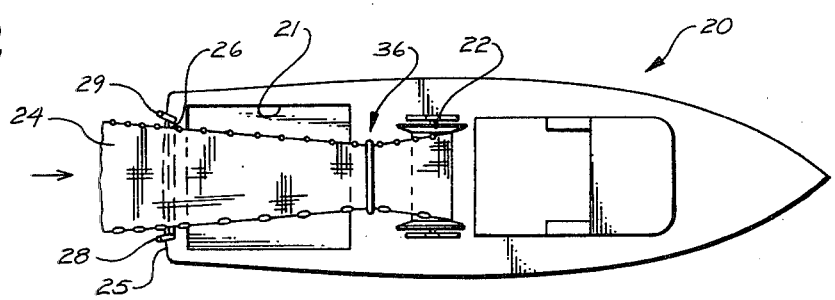
FIG. 2
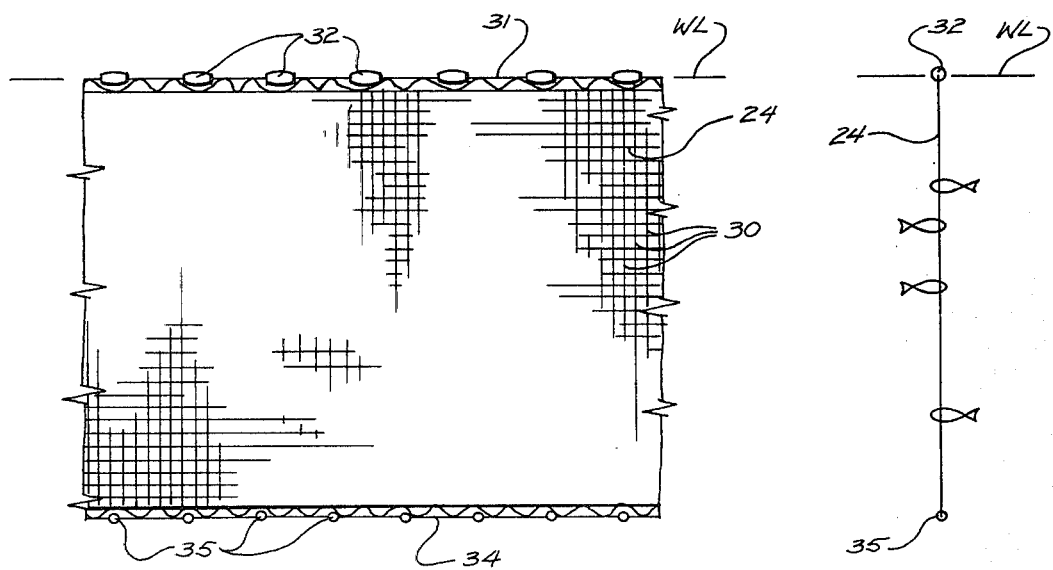
FIG. 3
FIG. 4

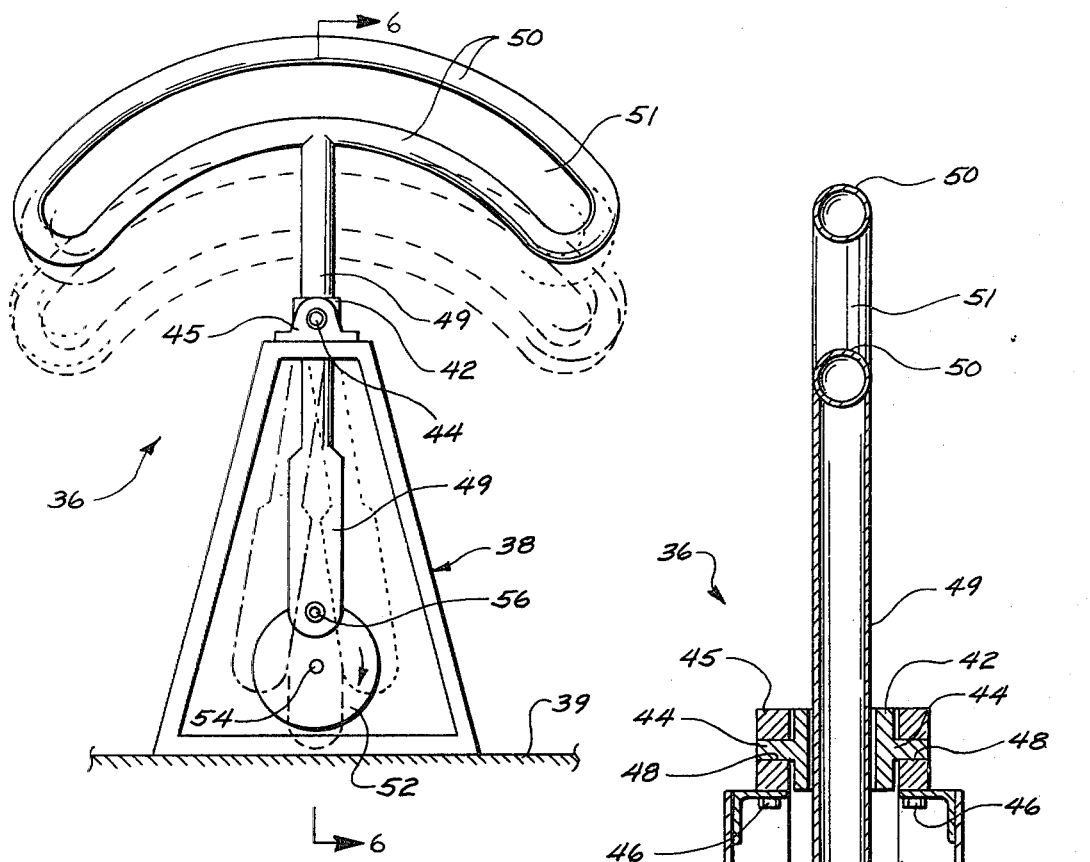
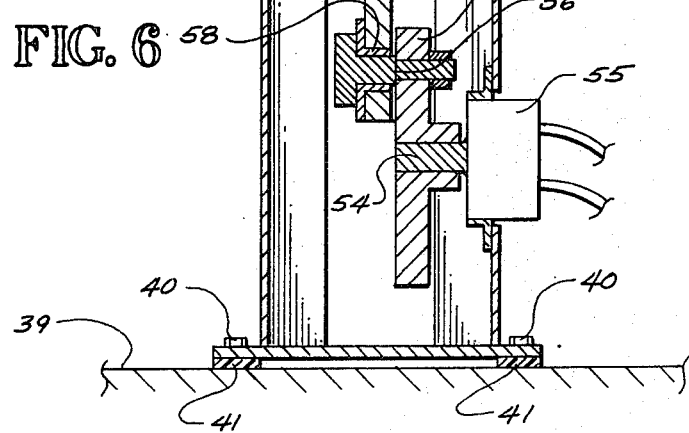
FIG. 5
FIG. 6

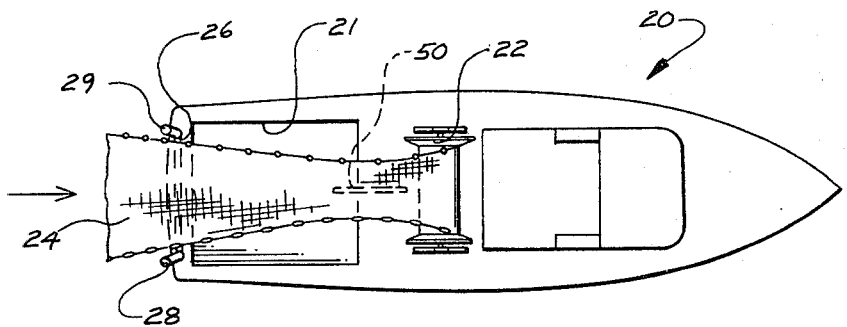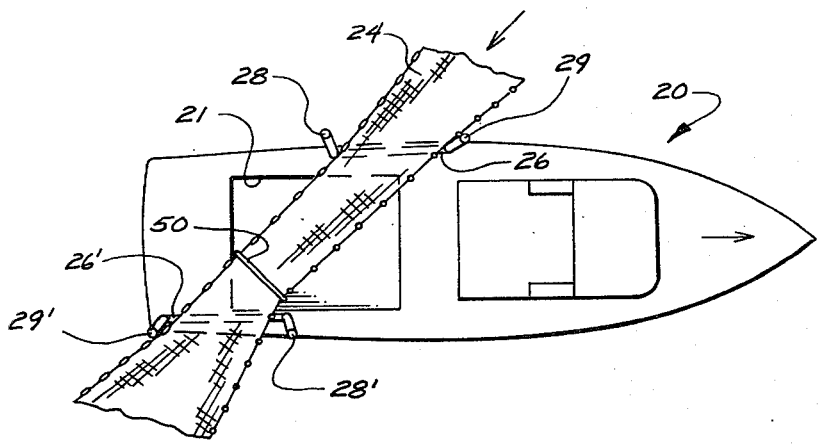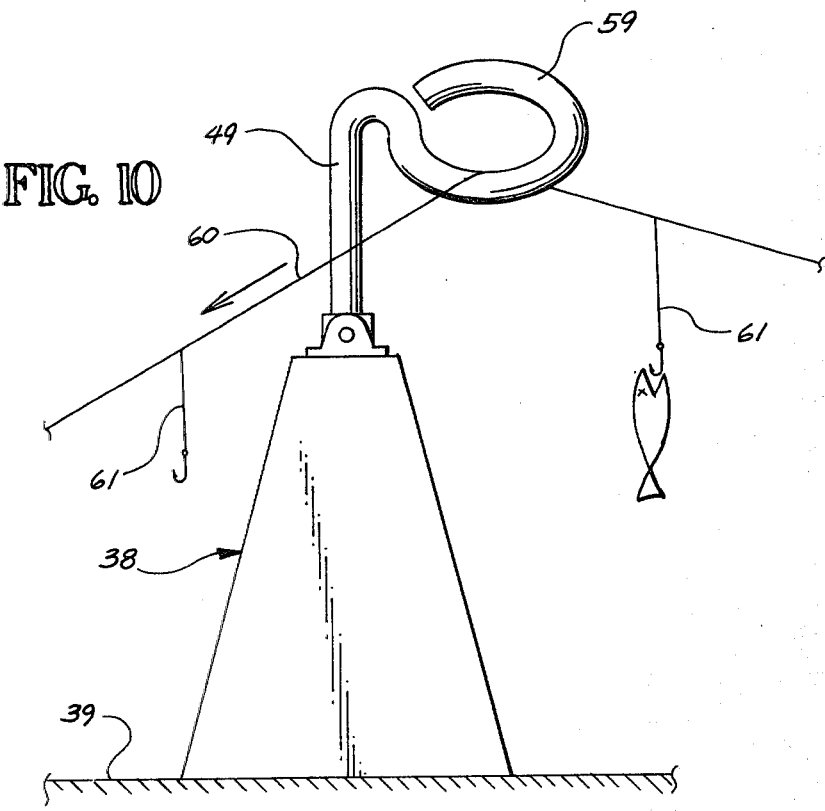

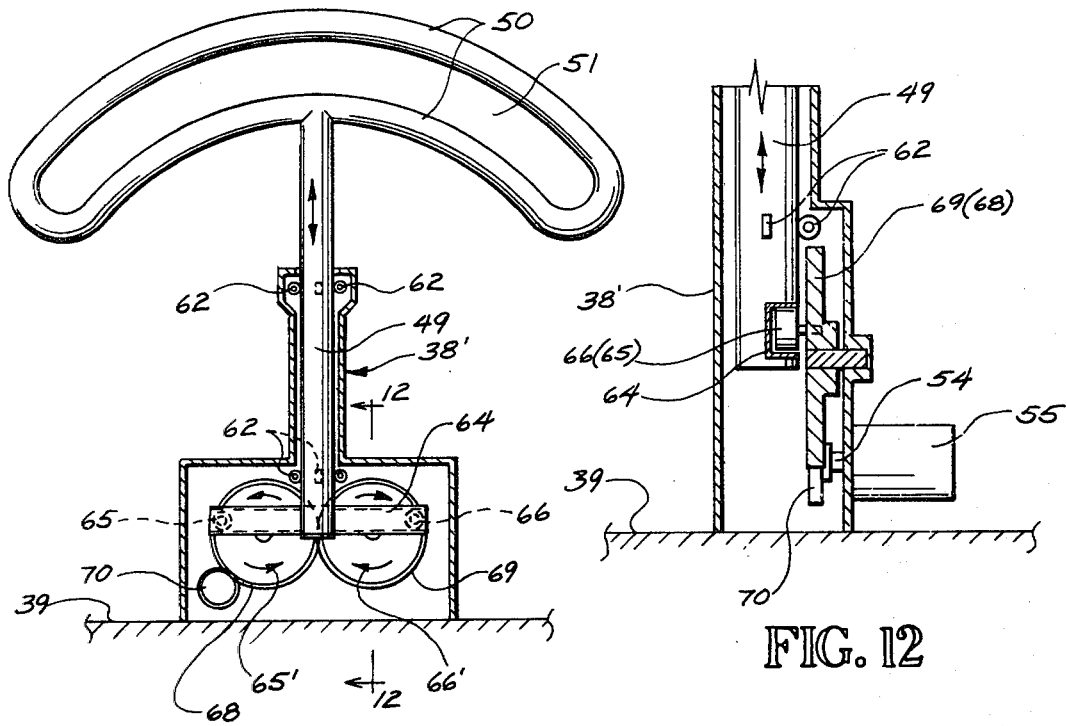

APPARATUS FOR SHAKING FISH FREE FROM GILLNETS, LONGLINES AND SIMILAR FISH CAPTURING MEANS

BACKGROUND OF THE INVENTION

The present invention relates in general to apparatus for disengaging fish from gillnets, longlines, and similar fish capturing means as such means are hauled aboard fishing vessels so as to permit such freed fish to fall into the hold of the fishing vessel or into other suitable fish collecting and/or processing means; and, more particularly, to shaking apparatus for gillnets or the like having an elongate eye with a convexly shaped gillnet supporting surface and wherein the gillnet is passed over the convex surface as it is hauled aboard so that the rapid shaking movement of the apparatus serves to spread the gillnet over the convexly shaped surface and to impart non-uniform, relatively violent, shaking motion to that portion of the gillnet approaching and passing over the convex surface, whereby fish caught in the gillnet are shaken loose with those fish disposed beneath the gillnet being free to fall downwardly into the hold of the fishing vessel, while those fish disposed above the gillnet are shaken loose therefrom and, because of the generally convex configuration of the gillnet, tend to move towards and over the cork and lead lines on the outboard edges of the gillnet from where they are free to fall into the hold of the fishing vessel.

In the fishing industry, and especially in the commercial fishing industry, many different types of equipment are employed for catching fish. However, once caught and brought aboard the fishing vessel, it is necessary to disengage the fish from the fish capturing equipment—e.g., from purse seines, gillnets, longlines, and the like—so as to permit collection of the fish in the hold of the vessel for storage and/or processing. Where the fish are captured in, for example, a roundhaul seine or purse seine, they are not individually snared within the interstices of the net webbing but, rather, are collected in bulk within the confines of the net; and, consequently, the fish may be readily dumped into the hold by opening the purse over the hold. On the other hand, when fish capturing means are employed wherein the fish are individually snared by their gills in the net webbing, or by engagement with fish hooks on longlines or the like, the need to free the fish as they are hauled aboard presents significant problems. This is particularly true in the case of gillnets which are commonly on the order of two fathoms (12') in vertical height—the span between the cork and lead lines—up to fifty fathoms (300') in length, although such gillnets do vary widely in size. For example, gillnets may vary from on the order of one fathom (6') to five fathoms (30'), or more, in vertical height; and/or a plurality of such nets may be strung together to form a single net up to and in excess of one thousand feet in length. Such nets are relatively heavy, cumbersome, and quite difficult to handle, even when not fully loaded with fish. These handling difficulties become even greater when the net is loaded with fish since catches are commonly from two or three tons per fifty fathoms of net length, or up to 200 lbs. of fish for every ten foot length of net.

When dealing with gillnets, as the net is hauled aboard with its catch of fish, it has generally been necessary for several fishermen to grasp the opposite edges of the net—viz., those edges including the cork and lead lines—and to manually shake the net in order to free the fish therefrom. This is a time consuming, labor-intensive job which requires considerable manpower and great strength and stamina. Moreover, the central portion of the gillnet tends to form a "pocket" as the net is physically shaken and, consequently, fish tend to collect in the center of the net rather than to fall off of the edges of the net into the hold. This has necessitated the use of "shaker strips"—viz., a strip running centrally along the length of the net where the mesh is sufficiently coarse that fish falling into the "pocket" can pass through the net webbing and drop into the hold. Such "shaker strips" are expensive to install and maintain; and, moreover, are ineffective for capturing fish when the net is in the water. That is, in a fishnet having a vertical height of twelve feet, if the "shaker strip" is two feet in width, then the effective capture area of the net is only ten feet per increment of length—i.e., an effective loss of approximately 16.67% of total net area. However, such a net is just as difficult to handle as one which is twelve feet in height but does not employ a "shaker strip".

Because of the considerable difficulties and significant physical labor involved when trying to disentangle fish from gillnets and the like, attempts have been made to mechanize the net shaking procedure. Generally, such attempts have involved highly complex mechanisms for beating and/or shaking the net as it is hauled aboard the vessel, normally with a "paddle wheel" type beater or with a mechanism for moving a generally horizontal net supporting surface up and down, with and/or without some component of motion along lines generally parallel to the direction of movement of the net as it is hauled aboard. Typical examples of such prior art attempts to solve the problem are those disclosed in Russian Pat. Nos. 185,624 (Oct. 22, 1966), 188,792 (Jan. 9, 1967), 199,557 (Aug.25, 1967), and 227,789 (Mar. 21, 1969). However, such attempts have not been commercially successful for a number of reasons. For example, when employing "paddle wheel" type beating mechanisms, the net shaker tends to rapidly damage the net. Moreover, the type of motions imparted to the net do not tend to move disengaged fish laterally towards the edges of the net but, rather, longitudinally along the length of the net. As a consequence, those fish freed from the upper surface of the net tend to collect in a "pocket" in the center of the net and this fact, coupled with the weight and flexible nature of the net itself, tends to prevent the fish collected on the upper surface of the net from falling into the hold of the vessel, thereby necessitating the use of "shaker strips". Moreover, the large size and complex nature of such fish shaking equipment precludes usage on smaller fishing vessels and, further, generally requires permanent installation which essentially prevents movement of the shaking equipment to a different operating position on the vessel.

SUMMARY OF THE INVENTION

Accordingly, it is a general aim of the present invention to provide a simple, compact and improved apparatus for shaking gillnets, longlines, and the like which overcomes the foregoing disadvantages inherent in the prior art and which permits disengagement of fish individually snared on such fish capturing means, thereby permitting such freed fish to fall into the hold of the fishing vessel or into similar fish collecting and/or processing means; yet, wherein there is substantially no tendency to impart physical damage to the net or other fish capturing means.

In one of its important aspects, it is an object of the invention to provide a gillnet shaking mechanism which, because of its configuration, tends to spread the gillnet and to cause the gillnet to assume a convex configuration—as contrasted with conventional net shakers which inherently result in formation of concave "pockets" in the center of the net—whereby the fish loosened from the upper surface of the net tend to move laterally away from the centerline of the net and towards and over the cork and lead lines. As a result of attaining this objective, there is no longer a need to provide expensive, space-wasting "shaker strips" since nets do not tend to "pocket" when shaken on apparatus embodying features of the present invention.

In one of its more detailed aspects, it is an object of the invention to provide simple, economic apparatus for shaking gillnets and the like which tends to impart not only an up-and-down shaking motion to the gillnet but, also, a lateral or side-to-side oscillatory motion so as to cause fish freed from the gillnet to move laterally away from the centerline and toward the edges of the net as it is hauled aboard to thereby permit such fish to drop off the lateral edges of the net—i.e., over the cork and lead lines—into the hold.

An ancillary object of the invention is the provision of a simple, compact, rugged shaking apparatus which is highly versatile and economic to manufacture, install and maintain; yet, which is reliable and effective in operation and which can increase the speed of off-loading of fish from gillnets and the like by a factor of two while, at the same time, requiring only half of the manpower previously required when attempting to manually shake fish free from such nets.

A further object of the invention is to provide an improved shaking mechanism for imparting motion to fish capturing means as such means are hauled aboard the vessel which is not only advantageous for use in freeing fish from gillnets and the like, but which is also suitable for use with longlines and which is highly effective in shaking fish free from hooks thereon.

Another important objective of the invention is the provision of a shaking apparatus for fishnets and similar fish capturing means which, because of its simple, compact and rugged construction, can be readily mounted on the deck of a fishing vessel in any one of a plurality of different positions dependent upon extant operating conditions and/or requirements; yet, which can be easily moved from one position to another when operating conditions and/or requirements change. Thus, apparatus embodying features of the invention can be mounted on the deck of a fishing vessel so as to permit the fish capturing means being hauled aboard to be stored on a winch drum or the like following shaking to disentangle fish therefrom or, alternatively, to permit the fish capturing means to be immediately discharged overboard for continued fishing operations. Moverover, the shaking apparatus can be oriented transversely of a net so as to spread the net between the cork and lead lines or, if desired, it can be turned 90° so as to be generally aligned with a net draped thereover as the net is hauled aboard, an arrangement that finds particularly advantageous use with deep nets. And, in all of these possible operating positions, the formation of "pockets" in a fishnet as it is shaken is precluded.

In one of its more detailed aspects, it is an object of the invention to provide a simple, compact and effective shaking apparatus for shaking fish free from gillnets and the like wherein provision is made for substantially eliminating the imposition of vibrating forces upon the structural members of the fishing vessel.

A further object of the invention is the provision of a shaking apparatus which can be installed on fishing vessels of a wide variety of sizes and shapes, ranging from small boats having a hold capacity on the order of only a few tons, to large vessels having hold capacities on the order of one hundred or more tons.

DESCRIPTION OF THE DRAWINGS

These and other objects and advantages of the present invention will become more readily apparent upon reading the following detailed description and upon reference to the attached drawings, in which:

FIG. 1 is a side elevational view here illustrating a gillnetter fishing vessel employing a stern mounted, power-driven winch for hauling the gillnet aboard;

FIG. 2 is a plan view of the fishing vessel illustrated in FIG. 1;

FIG. 3 is a fragmentary elevational view here depicting a portion of a conventional gillnet suspended by a cork line in the water;

FIG. 4 is a side elevational view of the gillnet illustrated in FIG. 3, here diagrammatically depicting the manner in which fish are captured therein;

FIG. 5 is a diagrammatic elevational view of a fish shaking apparatus embodying features of the present invention, here illustrating the net receiving eye of the novel shaker in solid lines in its uppermost position, in dashed lines in its lowermost position, and in fragmentary dotted lines and dash-dot lines in two selected intermediate positions;

FIG. 6 is a vertical sectional view taken substantially along the line 6—6 in FIG. 5 and illustrating details of the exemplary apparatus of the present invention;

FIG. 8 is a plan view, similar to FIG. 2, of a fishing vessel wherein an exemplary shaking apparatus of the present invention is mounted on the deck so as to be generally aligned with the direction of movement of the net as it is hauled aboard with the net being draped thereover, an arrangement which is particularly advantageous when working with deep nets;

FIG. 9 is a plan view, similar to FIGS. 2 and 8, but here illustrating shaking apparatus of the present invention oriented to permit the gillnet to be immediately discharged overboard for continued fishing operations;

FIG. 10 is a side elevational view of a modified form of shaking apparatus which is particularly suitable for use in shaking fish free from hooks on longlines and the like;

FIG. 11 is an elevational view similar to FIG. 5, but here illustrating a modified form of the invention in which the shaking apparatus is reciprocated vertically up-and-down while provision is made for counterbalancing vibratory forces so as to minimize the risk of damage to structural members of the fishing vessel; and, FIG. 12 is a fragmentary vertical sectional view taken substantially along the line 12—12 in FIG. 11, here depicting details of the modified form of the invention.

Figure 7:
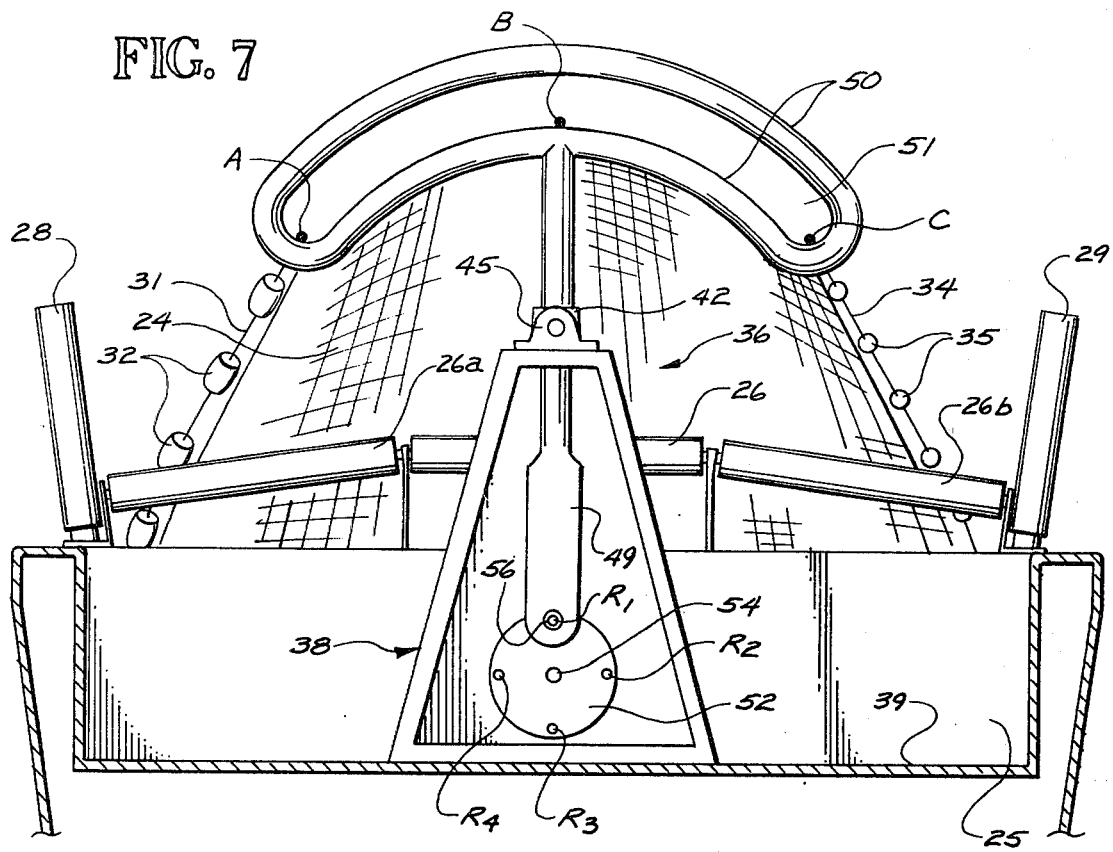
FIG. 7 is an end view taken substantially along the line 7—7 in FIG. 1, here illustrating particularly the relationship of the gillnet to the net shaking apparatus as the gillnet is hauled over the stern of the fishing vessel.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

DETAILED DESCRIPTION

Referring first to FIGS. 1 and 2, there has been illustrated, somewhat diagrammatically, a fishing vessel, generally indicated at 20, which here comprises a relatively conventional stern-mounted gillnetter. As the ensuing description proceeds, those skilled in the art will appreciate that the various forms of the present invention may be employed on a wide variety of fishing vessels ranging from small skiffs or boats having a hold capacity on the order of a few thousand pounds, to relatively large fishing vessels having hold capacities of 100,000 pounds or more; and, may include stern-mounted net handling equipment (in the manner depicted in the drawings), bow-mounted net handling equipment, side-mounted net handling equipment (Cf., FIG. 9), and/or longline handling equipment (Cf., FIG. 10). In short, although the invention has herein been illustrated and described primarily in connection with a stern-mounted gillnetter, in its broader aspects it is not limited to usage with any particular type of fishing vessel or, for that matter, to equipment limited to an ability to handle gillnetters—an arrangement where it does, however, find particularly advantageous use.

With the foregoing in mind, it will be noted that the fishing vessel 20 includes a hold 21 positioned to receive and store the catch of fish, and a power operated winch drum 22 driven by any suitable power means (not shown) for hauling a fish net—e.g., a gillnet 24—aboard. As here shown, the net 24 is hauled aboard over the stern 25 of the vessel 20 and, during its travel to the winch drum 22, passes directly over the hold 21 so as to permit discharge of the catch of fish from the net into the hold. To facilitate movement of the net over the stern 25 of the vessel 20, a roller 26—which may be either an idler roller or a driven roller powered by any suitable drive means (not shown)—is mounted on the stern of the vessel at, or just above, the gunnel. To insure proper guidance of the net 24 as it is hauled aboard, a pair of generally upright fairleads, which here take the form of idler rollers 28, 29, are provided adjacent the ends of roller 26.

As heretofore indicated, the present invention finds particularly advantageous, but not necessarily exclusive, use in those instances where the net 24 being handled by the fishing vessel 20 comprises a gillnet. Referring to FIGS. 3 and 4, a fragmentary portion of a typical gillnet 24 has been depicted as it would be oriented when in the water during normal fishing operations. Thus, as here shown, the gillnet includes: (i) a plurality of interwoven lines 30, defining the central webbing of the net; (ii) a cork line 31 disposed along the upper edge of the gillnet 24 and having a plurality of buoyant floats 32 for suspending the gillnet in the water from the waterline WL; and (iii), a lead line 34 at the lower edge of the gillnet having a plurality of weights 35 for causing the gillnet to assume a generally vertical, or curtain-like, position in the water. The arrangement is such that during fishing operations, fish are snared in the net 24 by entrapment of the fish gills in the webbing of the net, as best indicated diagrammatically in FIG. 4. It is because the fish are individually snared and entangled with the webbing 30 of the gillnet 34, that the net must be shaken as it is hauled aboard the fishing vessel 20 (FIGS. 1 and 2) during transit of the net over the hold 21 so as to loosen the snared fish from the net and permit such fish, when freed, to drop off the net 24 and into the hold 21.

In accordance with one of the important aspects of the present invention, a simple, compact, rugged and highly mobile and versatile shaker apparatus, generally indicated at 36 in FIGS. 1 and 2, is provided which is capable of violently shaking the net 24 during its passage over the hold 21 and its approach towards the shaker apparatus 36 so as to free the fish snared thereon and to permit such fish to fall freely from the net into the hold; yet, wherein the net is precluded from forming pocket-like concavities which tend to trap fish on the upper surface of the net. Although the various forms of the invention herein described are capable of violently shaking the net either (i) simply up-and-down or (ii), both simultaneously up-and-down and from side-to-side with relatively complex oscillatory motion, in both forms of the invention the desired shaking motion is provided with a minimum of moving components and in a manner which does not tend to damage the net itself.

In carrying out one exemplary form of the invention wherein the shaking motion imparted to the net is a composite vertical up-and-down reciprocating motion and a side-to-side oscillatory motion and, as best illustrated by reference to FIGS. 5 and 6 conjointly, it will be observed that one exemplary shaker apparatus 36 of the present invention includes a frame, generally indicated at 38, which is designed to be removably secured to the deck 39 of the fishing vessel 20 (FIGS. 1 and 2) in such a manner as to permit ease of movement from one position to another on the fishing vessel dependent upon the particular operating conditions and requirements. To accomplish this, the frame 38 is preferably bolted to the deck 39 by a plurality of bolts 40. To minimize transmission of vibratory forces from the shaker apparatus 36 to the deck 39 and other structural members of the vessel 20, the frame 38 is preferably mounted on a plurality of conventional, resilient, vibration absorbing mounts 41 (FIG. 6). A support element 42 having a pair of laterally projecting stub shafts 44 is pivotally mounted at the upper end of the frame 38 by means of a bearing block 45 secured to the frame 38 by any suitable fastening means—e.g., rivets, bolts or other fastening means 46 (FIG. 6)—and with the bearing block 45 having bearing surfaces 48 positioned to receive the laterally projecting stub shafts 44.

For the purpose of supporting the net 24 in a generally convex configuration while imparting shaking motion thereto, the shaker apparatus 36 preferably includes a generally vertically oriented, elongate, rod-like actuating member 49 which passes through the pivotal support element 42 with freedom for vertical reciprocation therein and which terminates at its upper end in a pair of closely spaced, laterally extending, support surfaces 50 which preferably have convexly curved shapes and which preferably comprise a generally closed loop defining a convexly shaped eye 51. In keeping with the invention, the convexly shaped net supporting surfaces 50, as well as the rod-like actuating member 49, are preferably formed of tubular metal stock such, for example, as steel tubing or the like, thereby providing a smooth, outer rounded surface for engaging the net 24 (FIGS. 1 and 2), thereby minimizing both frictional engagement with the net and the possibility of damaging the net as a result of the net webbing 30, buoyant floats 32, and/or weights 35 (FIG. 3) catching or otherwise snagging during transit over the support surface 50.

In the practice of the present invention, the convex support surfaces 50 and/or eye 51 preferably have a chordal span on the order of four to eight feet, although the actual dimensions are not critical and may vary depending upon the size of the fishing vessel 20 and/or the size of the net 24. Moreover, in operation the net 24 may be fed through the eye 51, in which event it is supported by the lowermost convex support surface 50 or, alternatively, the net may be fed over the eye 51, in which event it is supported by the uppermost convex support surface 50. The particular arrangement will vary dependent upon the relative widths of the net 24 and the eye 51. For example, when dealing with a net on the order of six feet in width—i.e., the vertical span between the cork and lead lines 31, 34—and a convex eye 51 having a chordal span of from five to six feet, excellent results have been obtained by threading the net through the eye 51. Under these conditions, the shaking motion imparted to the lowermost support surface 50 by the rod-like actuating member 49 is transmitted to the net and tends to cause the net to spread over the lower support surface 50 with the cork and lead lines 31, 34 gravitating in opposite lateral directions towards the lowermost outer extremities of the convexly shaped eye 51. On the other hand, when the width of the net 24 is substantially greater than the chordal span of the eye 51, the net is preferably trained over the eye so as to prevent bunching of the net as it is drawn over the shaker apparatus 36 by the power driven winch. In either case, however, the convex shape of both the lower and upper support surfaces 50 insures that the net assumes a generally convex configuration in the space between the roller 26 (FIGS. 1 and 2) at the stern 25 of the vessel 20 and the shaker apparatus 36, with the apex of the net as it travels over the hold 21 being generally coincident with the centerline of the net, thereby insuring that those fish freed from the upper surface of the net can slide laterally down the sloping surfaces of the net and over the cork and lead lines 31, 34 into the hold 21.

In order to impart the desired shaking motion to the support surfaces 50 and eye 51 and, thus to the net 24 passing thereover or therethrough, the lower end of the rod-like actuating member 49 is secured to a crank 52 (FIGS. 5 and 6) mounted on the crankshaft 54 of a conventional hydraulic motor 55 or the like by means of a shoulder bolt 56 passing through an oilite bushing 58 mounted in actuating member 49. The arrangement is such that upon energization of the motor 55, the rotational motion of the crankshaft 54 and crank 52 is converted into both vertical up-and-down reciprocating motion and the side-to-side oscillating motion of the rod-like actuating member 49. Thus, as best illustrated in FIG. 5 and assuming that crank 52 is rotating in a clockwise direction as viewed in the drawing, when the eccentric pivotal connection defined by the shoulder bolt 56 is in its uppermost position—i.e., at twelve o'clock as viewed in FIG. 5—the rod-like actuating member 49 and convex supporting surfaces 50 defining convex eye 51 are in their uppermost positions as indicated by the solid line portrayal of such components. As the crank 52 rotates through an angle of 90°, the rod-like actuating member 49 moves downwardly through pivotal support element 42 while, at the same time, it pivots about the fulcrum defined by the support element 42, thus causing the support surfaces 50 to assume the cocked position shown in FIG. 5 with the left extremities of the support surfaces 50 (as viewed in the drawing) being substantially lower than the right extremities thereof. Continued clockwise rotation of the crank 52 through a further 90° angle to the dashed line position shown in FIG. 5 causes the rod-like actuating member 49, the supporting surfaces 50, and the eye 51 to move downwardly to their lowermost positions with the right and left hand extremities of the convex eye 51 again lying in a generally horizontal plane. As the crank rotates through a further angle of 90° to the position indicated in FIG. 5 by dash-dot lines, the rod-like actuating member 49 begins to move upwardly and continues to pivot about the fulcrum defined by pivotal support element 42, thus causing the convex support surfaces 50 and eye 51 to assume the cocked position indicated by the dash-dot lines in FIG. 5 wherein the left extremities of the eye 51 and support surfaces 50 are substantially above the right extremities thereof. As the crank 52 continues to rotate and complete its first revolution, the shaker components are returned to the solid line positions shown in FIG. 5.

Figures 7A, 7B, 7C:
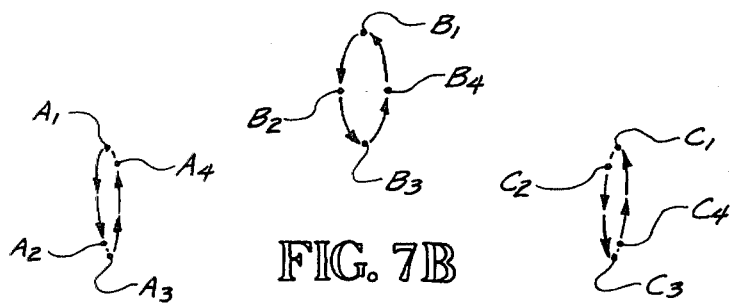
FIGS. 7A through 7C are diagrammatic motion diagrams illustrating particularly the paths of movement for hypothetical points A, B, and C, respectively, on the exemplary fish shaking apparatus shown in FIG. 7 as the apparatus is driven through a shaking cycle.

Referring to FIG. 7 and FIGS. 7A–7C conjointly, the effect of the foregoing shaking motion as imparted to a net 24 can be more fully understood. Thus, as here shown, it will be noted that a gillnet 24 is trained over roller 26 (and, if desired, over pair of slightly inclined outboard rollers 26a and 26b which, together with roller 26, define a generally convex support surface just above the gunnel at the vessel's stern 25), between fairlead rollers 28, 29, and through the convexly shaped eye 51. Therefore, the net 24 is supported by the lowermost convex support surface 50 defining convex eye 51. Considering, for example, three hypothetical points A, B and C, where the net 24 is supported by support surface 50, it will be appreciated that when the apparatus is in the position shown in FIG. 7, the pivotal connection 56 between the rod-like actuator 49 and crank 52 is located at point $R_1$ and, consequently, the support surface 50 and net 24 are at their uppermost positions with hypothetical points A, B and C being disposed at the positions $A_1$, $B_1$ and $C_1$ as indicated in FIGS. 7A–7C, respectively. As the crank is rotated through an angle of 90° to position the pivotal connection 56 at point $R_2$, the rod-like actuating member 49 moves downwardly and the convex support surface 50 begins to cock downwardly to the left with hypothetical points A, B and C occupying the positions $A_2$, $B_2$ and $C_2$ as shown in FIGS. 7A–7C. In short, the extent of movement and, therefore, the acceleration and speed of point A as it moves from position $A_1$ to $A_2$ is appreciably greater than that of point C as it moves from position $C_1$ to $C_2$. Continued crank rotation through a further angle of 90° to the position indicated at point $R_3$ causes points A, B and C to move to the positions $A_3$, $B_3$ and $C_3$—i.e., to the lowermost position of the shaker apparatus 36—and, during this portion of the cycle, point C moves through a greater distance and, therefore, at greater speed, than does point A. During the next 90° of crank rotation, the pivotal connection 56 moves upwardly from point $R_3$ to $R_4$, the support surfaces cock to the right as viewed in the drawing, and point A moves upwardly and to the right from position $A_3$ to position $A_4$ (FIG. 7A), while point C moves upwardly and to the right through a lesser distance and at a lesser speed from position $C_3$ to position $C_4$. During the final quarter cycle of crank rotation, the components are returned to the original uppermost position, with point C moving through a greater distance and at a higher speed from position $C_4$ to position $C_1$ (FIG. 7C) than point A which moves from position $A_4$ to position $A_1$ (FIG. 7A). The effect of such motion is to impart a relatively violent, non-uniform shaking motion to the net 24 comprising both vertical up-and-down reciprocation and side-to-side oscillation, thus freeing fish from the net 24 and permitting such freed fish to drop from the net into the hold 21 (FIGS. 1 and 2).

As a result of (i) the convex configuration of the net and (ii), the components of motion imparted to the fish by movement of the net, those fish located on the upper surface of the net, when freed therefrom, tend to slide laterally across the downwardly sloping sides of the net 24 and drop over the cork and lead lines 31, 34 into the vessel's hold. Moreover, the violent shaking motion imparted to the net 24 tends to cause the net to spread over the convex support surface 50 with the cork and lead lines 31, 34 gravitating outwardly and occupying the opposite lower left and right extremities, respectively (as viewed in FIG. 7), of the convex eye 51.

Those skilled in the art will appreciate that in those instances where the span of the net 24 between the cork and lead lines 31, 34 is appreciably greater than the chordal span of the convex eye 51, it is merely necessary to train the net over the upper convex surface 50 defining eye 51, in which event the opposite edges of the net would hang generally vertically downward from the outer extremities of the upper support surface 50. Alternatively, when working with deep nets, the shaker apparatus 36 may itself be rotated through an angle of 90° so that the convexly shaped support surfaces 50 are generally aligned with the vessel's keel and with the longitudinal centerline of the net in the manner shown in FIG. 8. Indeed, when working with relatively deep nets—e.g., nets having a span between the cork and lead lines 31, 34 on the order of up to, or in excess of, thirty feet—it would be possible to form the rod-like actuating member 49 from either telescoping parts or from multiple tubular parts capable of being separated from one another and joined to an extension shaft, all in a manner well known to persons skilled in the art and, therefore, not shown in the drawings. The result of such an arrangement would be to elevate the convex support surfaces 50 to a desired height sufficient to accommodate relatively wide nets either draped over the uppermost support surface 50 in the manner shown in FIG. 8 or, over the uppermost surface 50 of shaker apparatus 36 oriented transversely of the vessel 20 as depicted in FIGS. 1, 2 and 7.

In many instances, it is desirable that the fish net 24 be hauled aboard the vessel 20, shaken to free the catch of fish therein, and immediately discharged overboard to permit continuous fishing operations. Such an arrangement has been indicated in FIG. 9 where, for example, a gillnet 24 is hauled aboard over the port gunnel and discharged over the starboard gunnel. Thus, as here shown the net 24 is trained: (i) over a roller 26 and between a pair of fairlead rollers 28, 29 located just above the port gunnel; (ii) then over the convex shaped support surface 50 of a shaker apparatus 36 embodying the features of the present invention located on the aft starboard quarter of the vessel; and (iii), overboard over a roller 26' and between fairlead rollers 28', 29' just above the starboard gunnel. Preferably one, or both, of rollers 26 and 26' are power driven so as to assist in hauling net 24 aboard and discharging the net overboard; although both the movement of the vessel 20 in the water and the prevailing winds and tidal currents, together with the fact that such gillnets would conventionally be anchored in the water, can be utilized either alone or in conjunction with power driven rollers 26 and/or 26' to provide the motive power necessary to haul the net aboard.

While those skilled in the art will appreciate that the present invention finds particularly advantageous use in shaking fish free from gillnets and the like, it can also be utilized when operating with longlines. Thus, referring to FIG. 10 there has been illustrated a modified form of the invention which may here be identical in all respects to the shaker apparatus described above in conjunction with FIGS. 5 and 6; except, that in this instance the rod-like actuating member 49 terminates at its upper end in a relatively small eye 59 through which is passed a longline 60 having a plurality of fish hooks attached thereto along the length of the longline. Thus, as the longline 60 is hauled through the eye 59, the violent shaking action provided by movement of the rod-like actuating member 49 in the manner previously described serves to violently shake the longline 60 and hooks 61, causing the fish caught thereon to be shaken loose and to fall into the hold of the vessel.

Turning now to FIGS. 11 and 12, there has been illustrated a further modified form of the invention wherein provision is made for minimizing the vibratory forces imposed on the deck 39 and other structural members of the fishing vessel 20. To this end, the rod-like actuating member 49 is mounted in a frame 38' secured to the deck 39 of the vessel with freedom for up-and-down vertical reciprocation between vertically spaced sets of guide rollers 62 carried by the frame 38'. The lower end of actuating member 49 is rigidly secured to a channel-shaped cross beam 64 which here serves as a cam follower and which is dimensioned to receive a pair of cam rollers 65, 66 respectively mounted on a pair of meshed, counter-rotating spur gears 68, 69. In this form of the invention, motive power to drive the meshed countra-rotating spur gears 68, 69 is transmitted via drive gear 70 meshed with spur gear 68 and secured to the output shaft 54 of a suitable hydraulic motor 55 or similar source of motive power. The arrangement is such that upon energization of motor 55, the meshed contra-rotating spur gears 68, 69 are driven by drive gear 70, thereby causing the cam rollers 65, 66 to move in unison along the paths indicated by arrows 65', 66', respectively. As such cam rollers 65, 66 move along their respective circular paths 65', 66', they reciprocate back and forth within cam follower 64, thereby driving cam follower 64 vertically up-and-down and causing the rod-like actuating member 49 to transmit rapid vertical shaking movement to the convex support surfaces 50 and eye 51 to thereby shake the fish net being trained through or over the eye. Because of the provision of contra-rotating gears 68, 69, which here act as counter-weights, to transmit motive power to drive the rod-like actuator up and down, vibratory forces tend to be counter-balanced and, consequently, the tendency to impart vibratory forces to the deck 39 and other structural members of the vessel is substantially minimized.

Those skilled in the art will appreciate that there has hereinabove been described various forms of shaker apparatus which are characterized by their simplicity, compactness, ruggedness and mobility, thereby permitting such apparatus to be used on a wide range of fishing vessels and under a wide range of differing operating conditions. In all instances, the fishing net is precluded from forming pockets or concavities as it travels over the hold and, consequently, there is no tendency to trap fish on the upper surface of the net but, rather, those fish loosened from the net as a result of the shaking motion are permitted to slide over the downwardly sloping surfaces of the net and to drop into the hold. Moreover, the various arrangements described achieve the desired shaking motion without subjecting fish nets to beating action or to other forces which tend to damage the nets.

The use of an eye 51 (see, e.g., FIGS. 5–7) allows a much higher cycling speed than the existing beater-type shakers as the net is violently thrown downward by the top of the eye rather than depending upon gravity to fall to the point where it can be thrust upward by the beater. This greatly increases the speed and amplitude and results in a sharp, more effective motion. Fish shaking apparatus embodying this feature of the present invention has been found to pass fewer than 0.15% of the fish snared in a gillnet without requiring human effort to remove the fish.

What is claimed is:

1. Apparatus for shaking fish free from gillnets, longlines, and like fish-capturing means on a fishing vessel of the type having fish collecting means and means for hauling such fish-capturing means aboard, comprising, in combination:
   (a) a deck mounted frame:
   (b) a generally vertically oriented, elongate, rod-like member coupled to and supported by said frame with freedom for vertical reciprocation relative to said frame;
   (c) means defining a support surface formed at the upper end of said rod-like member for receiving and guiding such fish-capturing means as such fish capturing means are hauled aboard the fishing vessel; and,
   (d) drive means coupled to the lower end of said rod-like member for reciprocating said member in a vertical direction so as to impart rapid up-and-down vertical movement to said support surface at the upper end of said member to violently agitate the fish-capturing means being drawn over said support surface to thereby disengage fish from said fish-capturing means and permit such disengaged fish to fall into the fish collecting means on the fishing vessel.

2. The combination as set forth in claim 1 wherein said support surface defining means defines a convex net supporting surface so that upon reciprocation of said support surface defining means the net is spread across the convex span of said supporting surface with the cork and lead lines on the net gravitating towards the opposite lower extremities of said convex net supporting surface for maintaining the portion of the net being drawn towards and over said convex net supporting surface in a generally convex spread configuration in the span between the cork and lead lines whereby fish projecting above the surface of the net are, when shaken loose from the net, free to slide laterally over the convex surface of the net and to fall from the opposite edges of the net into said fish collecting means.

3. The combination as set forth in claim 1 wherein said support surface defines an eye shaped to receive a longline having a plurality of fish engaging hooks thereon so that upon reciprocation of said eye defining surface the longline and fish engaged on the hooks thereon are shaken as the line is drawn through said eye so as to shake fish free of the hooks and to permit such disengaged fish to fall into said fish collecting means.

4. The combination as set forth in claim 1 wherein said support surface defines an eye shaped to receive a gillnet so that upon reciprocation of said eye defining surface the gillnet being drawn towards said eye is violently shaken to disengage those fish suspended therefrom by their gills and to permit such disengaged fish to fall into said fish collecting means.

5. The combination as set forth in claim 4 wherein said eye defining surface defines a gillnet receiving eye on the order of from four to eight feet in width.

6. The combination as set forth in claims 4 or 5 wherein said eye defining surface defines a convex gillnet supporting surface so that upon reciprocation of said eye defining surface the gillnet is spread across the convex span of said supporting surface with the cork and lead lines on the gillnet gravitating to the opposite lower ends of said convex supporting surface for maintaining the portion of the gillnet being drawn towards and through said eye in a generally convex spread configuration in the span between the cork and lead lines whereby those fish suspended by their gills and projecting above the surface of the gillnet are, when shaken loose from the gillnet, free to slide laterally over the convex surface of the gillnet and to fall from the opposite edges of the gillnet into said fish collecting means.

7. The combination as set forth in claims 4 or 5 wherein said eye defining surface defines an enclosed convex gillnet supporting surface so that upon reciprocation of said eye defining surface the gillnet is spread across the convex span of said supporting surface with the cork and lead lines on the gillnet gravitating to the opposite lower ends of said enclosed convex supporting surface for maintaining the portion of the gillnet being drawn towards and through said eye in a generally convex spread configuration in the span between the cork and lead lines whereby those fish suspended by their gills and projecting above the surface of the gillnet are, when shaken loose from the gillnet, free to slide laterally over the convex surface of the gillnet and to fall from the opposite edges of the gillnet into said fish collecting means.

8. The combination as set forth in claim 1 wherein means are provided for minimizing transmission of vibratory forces from said fish shaking apparatus to the deck and other structural members of said fishing vessel.

9. The combination as set forth in claim 8 wherein said means for minimizing transmission of vibratory forces comprises a plurality of vibration absorbing mounts interposed between said frame and the deck of said vessel.

10. The combination as set forth in claim 1 wherein said drive means comprises a cam follower secured to the lower end of said rod-like member, a pair of meshed contra-rotating gears carried by said frame, cam means mounted on each of said contra-rotating gears and received within said cam follower for reciprocating motion therein as said contra-rotating gears move through rotational cycles for causing said cam follower and said rod-like member to reciprocate vertically up-and-down, and a motor drivingly coupled to one of said gears for causing rotation thereof.

11. Apparatus for shaking fish free from gillnets, longlines, and like fish-capturing means on a fishing vessel of the type having fish collecting means and means for hauling such fish-capturing means aboard, comprising, in combination:
(a) a deck mounted frame:
(b) a means defining a support element pivotally mounted on said frame;
(c) a generally vertically oriented, elongate, rod-like member coupled to and supported by said support element with freedom for vertical reciprocation relative to said support element;
(d) means defining a support surface formed at the upper end of said rod-like member for receiving and guiding such fish-capturing means as such fish capturing means are hauled aboard the fishing vessel; and,
(e) drive means coupled to the lower end of said rod-like member for oscillating the lower end of said member from side-to-side and for simultaneously reciprocating said member in a vertical direction so as to impart rapid up-and-down vertical movement and side-to-side oscillating movement to said support surface at the upper end of said member to violently agitate the fish-capturing means being drawn over said support to thereby disengage fish from said fish-capturing means and permit such disengaged fish to fall into the fish collecting means on the fishing vessel.

12. The combination as set forth in claim 11 wherein said support surface defining means defines a convex net supporting surface so that upon oscillation of said support surface defining means the net is spread across the convex span of said supporting surface with the cork and lead lines on the net gravitating towards the opposite lower extremities of said convex net supporting surface for maintaining the portion of the net being drawn towards and over said convex net supporting surface in a generally convex spread configuration in the span between the cork and lead lines whereby fish projecting above the surface of the net are, when shaken loose from the net, free to slide laterally over the convex surface of the net and to fall from the opposite edges of the net into said fish collecting means.

13. The combination as set forth in claim 11 wherein said support surface defining means defines a convex net supporting surface so that upon oscillation of said support surface defining means the net is spread across the convex span of said supporting surface with the cork and lead lines on the net gravitating towards the opposite lower extremities of said convex net supporting surface for maintaining the portion of the net being drawn towards and over said convex net supporting surface in a generally convex spread configuration in the span between the cork and lead lines whereby fish projecting above the surface of the net are, when shaken loose from the net, free to slide laterally over the convex surface of the net and to fall from the opposite edges of the net into said fish collecting means.

14. The combination as set forth in claim 11 wherein said support surface defines an eye shaped to receive a gillnet so that upon oscillation of said eye defining surface the gillnet being drawn towards said eye is violently shaken to disenage those fish suspended therefrom by their gills and to permit such disengaged fish to fall into said fish collecting means.

15. The combination as set forth in claim 14 wherein said eye defining surface defines a gillnet receiving eye on the order of from four to eight feet in width.

16. The combination as set forth in claims 14 or 15 wherein said eye defining surface defines a convex gillnet supporting surface so that upon oscillation of said eye defining surface the gillnet is spread across the convex span of said supporting surface with the cork and lead lines on the gillnet gravitating to the opposite lower ends of said convex supporting surface for maintaining the portion of the gillnet being drawn towards and through said eye in a generally convex spread configuration in the span between the cork and lead lines whereby those fish suspended by their gills and projecting above the surface of the gillnet are, when shaken loose from the gillnet, free to slide laterally over the convex surface of the gillnet and to fall from the opposite edges of the gillnet into said fish collecting means.

17. The combination as set forth in claims 14 or 15 wherein said eye defining surface defines an enclosed convex gillnet supporting surface so that upon oscillation of said eye defining surface the gillnet is spread across the convex span of said supporting surface with the cork and lead lines on the gillnet gravitating to the opposite lower ends of said enclosed convex supporting surface for maintaining the portion of the gillnet being drawn towards and through said eye in a generally convex spread configuration in the span between the cork and lead lines whereby those fish suspended by their gills and projecting above the surface of the gillnet are, when shaken loose from the gillnet, free to slide laterally over the convex surface of the gillnet and to fall from the opposite edges of the gillnet into said fish collecting means.

18. The combination as set forth in claims 11, 12, 13, 14 or 15 wherein said drive means comprises a motor having a driven crankshaft and a crank mounted thereon, said crank being coupled to the lower end of said rod-like member for causing said member to reciprocate vertically relative to said pivotally mounted support element and to simultaneously oscillate about the pivotal connection between said frame and said support element so that said support surface is simultaneously oscillated from side-to-side and reciprocated vertically for violently agitating the fish-capturing means being drawn over said support surface to thereby disengage fish from said fish-capturing means.

19. The combination as set forth in claim 11 wherein means are provided for minimizing transmission of vibratory forces from said fish shaking apparatus to the deck and other structural members of said fishing vessel.

20. The combination as set forth in claim 19 wherein said means for minimizing transmission of vibratory forces comprises a plurality of vibration absorbing mounts interposed between said frame and the deck of said vessel.

* * * * *